April 5, 1932.  C. L. CAMP  1,852,200

EXCAVATOR AND CONVEYER FOR CONTRACTORS' USE

Filed Dec. 1, 1930  3 Sheets-Sheet 1

Clarence L. Camp
INVENTOR

BY
ATTORNEY

April 5, 1932.  C. L. CAMP  1,852,200
EXCAVATOR AND CONVEYER FOR CONTRACTORS' USE
Filed Dec. 1, 1930  3 Sheets-Sheet 2
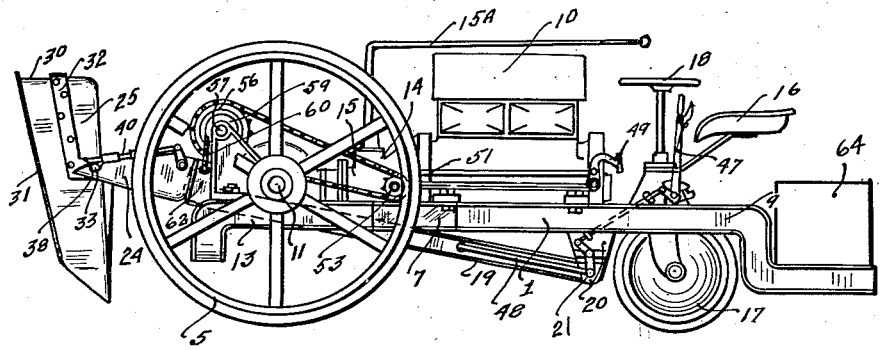
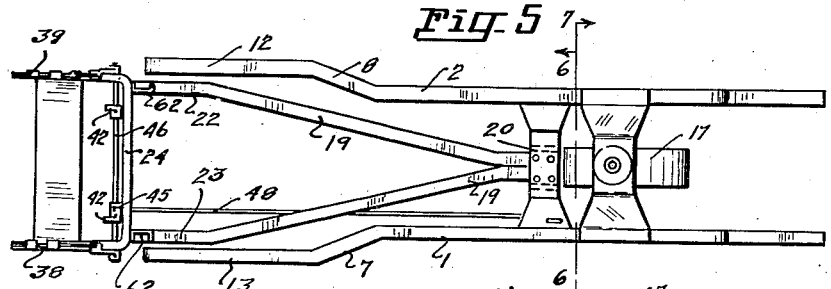
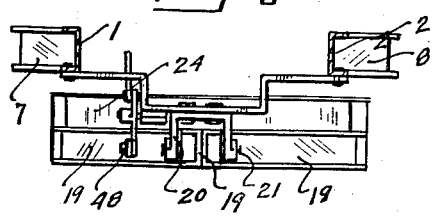
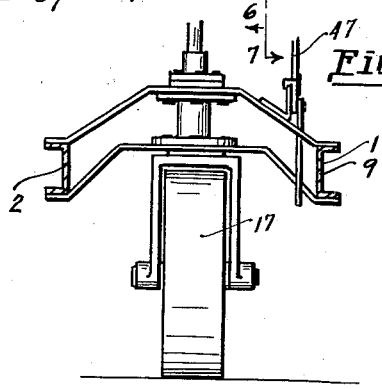
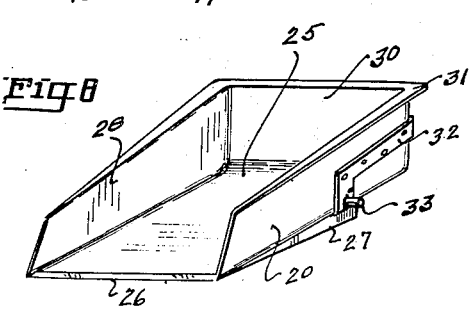
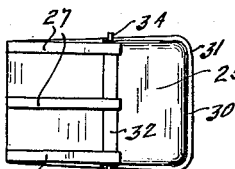
Clarence L. Camp
INVENTOR
BY Thomas Bilyeu
ATTORNEY April 5, 1932.  C. L. CAMP  1,852,200
EXCAVATOR AND CONVEYER FOR CONTRACTORS' USE
Filed Dec. 1, 1930  3 Sheets-Sheet 3
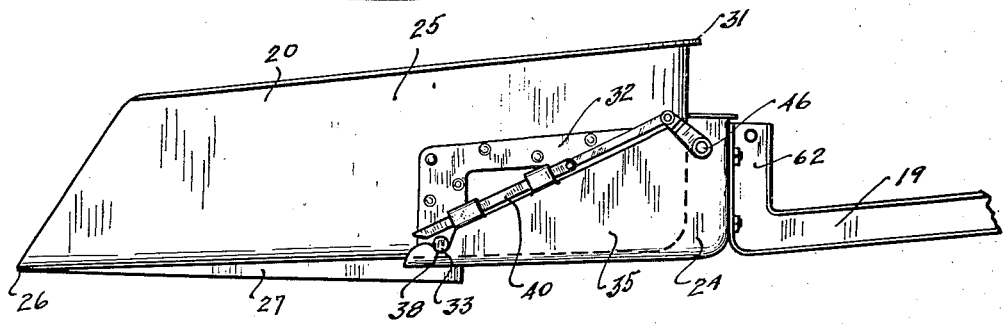
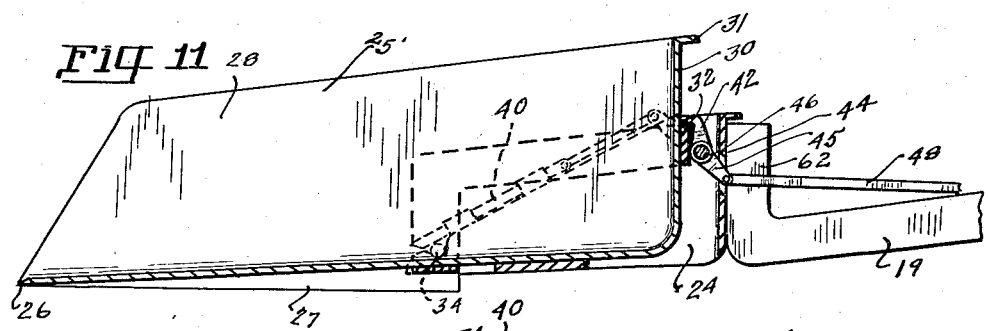
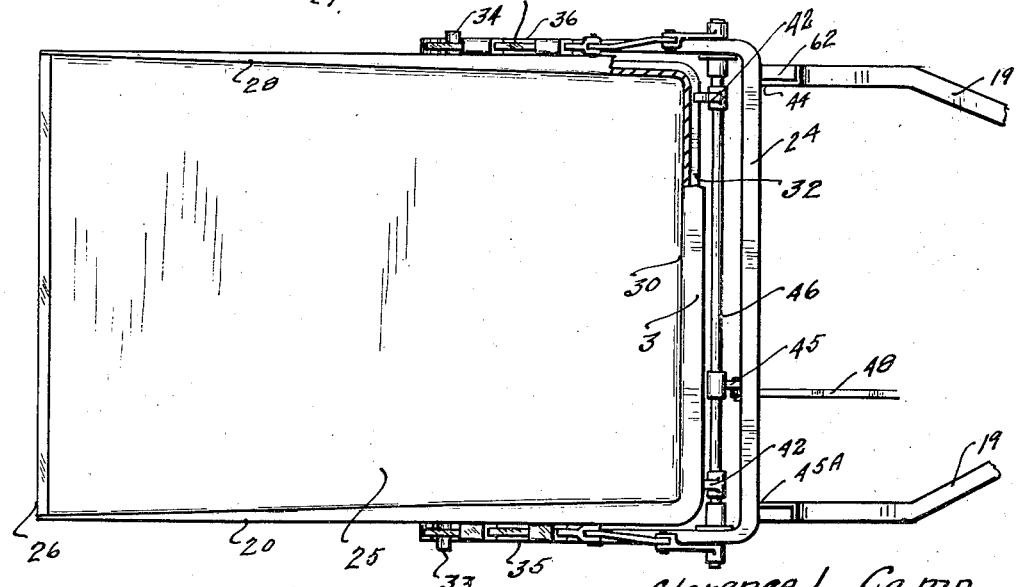
Clarence L. Camp
INVENTOR
BY
ATTORNEY Patented Apr. 5, 1932

1,852,200

UNITED STATES PATENT OFFICE

CLARENCE L. CAMP, OF SPOKANE, WASHINGTON

EXCAVATOR AND CONVEYER FOR CONTRACTORS' USE

Application filed December 1, 1930. Serial No. 499,259.

The purpose and object of my invention is to provide a power driven wheeled machine and adapted to be ridden and manipulated by the operator of the same and having means provided for the utilization of a plurality of bucket units, each of which may be attached and detached from the automotive unit, quickly and at the will of the operator; means also being provided for the raising of the attaching frame to the bucket, in order that the bucket may be transported, when picked up, and be dumped without interference from the dump bank or the dump pile. A further object in raising the bucket is to permit the climbing of a relatively steep incline without interference of the bucket with the incline.

The invention consists primarily of a frame having supporting walls associated therewith and a prime mover mounted thereupon with an adjustable boom being hingedly secured, to the underside of the frame, and having a simple means for the raising and lowering within limited ranges of the frame and bucket, or dipper that is carried on its forward end, to which the buckets are to be attached and detached.

Heretofore it has been necessary, in power actuated shovels, to have a single dipper manipulatively mounted upon the boom which was used for loading purposes, the dipper being manipulated upon the boom and being used for the shoveling, of material to be handled over the bank or into independent conveying mechanisms.

My device is intended as a light duty power driven shovel which may be used in rock quarries for the feeding of crushers; it may be used in the digging of basements, the making of cuts and fills, the cleaning up of roadways, as a back filler for trench work, and in sewer digging, wherein a plurality of buckets, or dippers may be used and filled by hand or otherwise, and when filled, be picked up by the power driven unit, elevated and transported to the dump and returned to the point of use; at which time the same is detached from the power driven unit and another picked up and transported and dumped.

I have shown in my drawings the tractor as being a three wheeled tractor, but I do not wish to be limited to three wheels, as a greater number of wheels or a smaller diameter may be used or self laying track or wheeled support may be utilized with equal facility. The buckets may be used as a dipper at the toe of the slope and the bucket be filled by the crowding of the bucket, or dipper into the toe of the slope of the material being handled, or to be handled.

One of the objects of my invention, is to provide a relatively cheap power driven tractor unit, that may be operated by a single operator and that may be used in a number of ways for the efficient handling of materials and for various purposes.

A further object of my invention consists in providing a power driven unit, through the use of which, a number of different applications may be made for the handling of materials and for various purposes.

A still further object of my invention consists in providing a simply constructed unit comprised of but few parts and that gives full visibility to the operator of the same and for the handling of the loading and unloading and attaching, or detaching, of the dipper, or bucket, thereto when filled or empty.

A still further object of my invention consists in providing a power driven unit having an extremely low center of gravity, to thereby permit its being operated over relatively uneven terrain without the hazard of the same tipping over, with the incident hazards that result to the operator and other workmen disposed thereabout.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings:

In Figs. 1, 2 and 3, the dipper, or bucket, is shown in loading and attached position.

Fig. 4 is a side view of the assembled device, illustrating the bucket in dumping position.

Fig. 5 is a top, plan view of the frame and boom, illustrating the same detached from the bucket.

Fig. 6 is a sectional, end view, of the mechanism illustrated in Fig. 5, the same being taken on line 6—6 of Fig. 5, looking in the direction indicated.

Fig. 7 is a sectional, end view, of the mechanism illustrated in Fig. 5, the same being taken on line 7—7 of Fig. 5, looking in the direction indicated.

Fig. 8 is a perspective, end view, of the dipper, or bucket.

Fig. 9 is an inverted, plan view of the mechanism illustrated in Fig. 8, the same being an underside, plan view, of the bucket, or dipper.

Fig. 10 is a side view of the bucket or dipper and of the head, disposed upon the outer end of the boom and illustrating the dipper, or bucket, in place and attached to the front end of the boom.

Fig. 11 is a sectional, side view of the bucket and of the attaching mechanism.

Fig. 12 is a top, plan view of the dipper or bucket and of the attaching means for securing the same to the boom.

Like reference characters refer to like parts throughout the several views.

Figure 1:
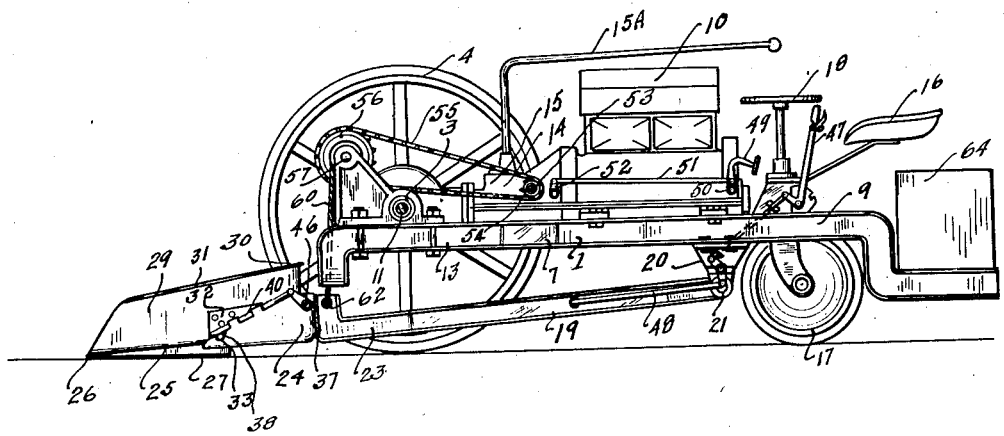
Fig. 1 is a sectional, side view of the assembled device.
Figure 2:
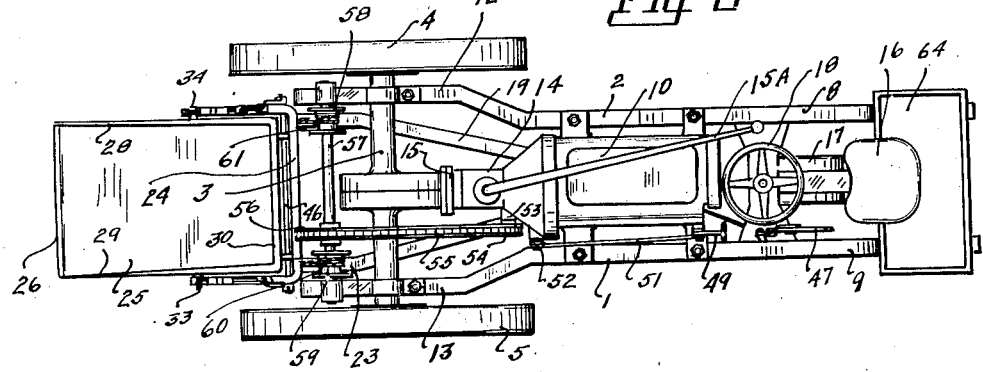
Fig. 2 is a top, plan view of the assembled device.
Figure 3:
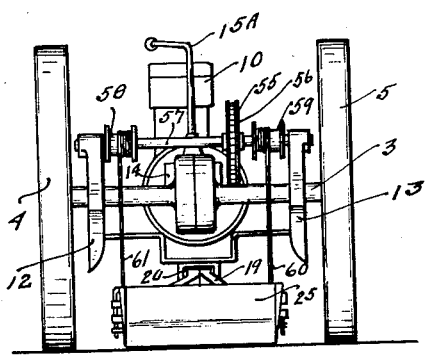
Fig. 3 is a front, end view, of the assembled device.

I preferably form my device of a fabricated frame comprised of side rails 1 and 2 and secure the same to an axle housing 3. The side frame members being spaced apart the greatest amount at the forward end, to bring the same in close proximity to the wheels 4 and 5 that are secured to the outer ends of the axles that are disposed within the axle housing 3. Offsets 6 and 7 are disposed within the side frames to bring the rearward ends 8 and 9 closer together than at the forward ends with the rear ends 8 and 9 of the side frames being parallelly disposed to each other.

A prime mover 10, as an internal combustion motor, is mounted within the frame and is so arranged through suitable driving shafts and associated coacting gears to impart rotation to the axle 11 disposed within the side walls 12 and 13 of the frame secured to the axle. A transmission gear box 14 is disposed within the frame 15 to provide suitable means for the changing of the speed ratios between the prime mover and the wheels. A shift lever 15A is provided adjacent the seat 16 upon which the operator rides to manipulate the same. A pilot wheel 17 is disposed at the rear of the side frame members and is adapted for being manipulated through a steering wheel 18 also disposed adjacent the seat 16 upon which the operator is normally positioned. A bifurcated boom 19 is hingedly secured to a bracket 20 disposed upon the underside of the frame, the same being hingedly secured thereto about a journal shaft 21. The bifurcated boom is composed of side wall members 22 and 23 and are spaced apart the greatest amount at the forward end terminating in a yoke 24 secured to the forward end of the side wall members 22 and 23 of the boom.

I use a plurality of bucket members 25, the same being comprised of an open ended member having a cutting edge 26 disposed at its forward end having dipper teeth 27 disposed upon the under side of the forward ends to reinforce the same and to eliminate the frequent reconditioning of the buckets. Side walls 28 and 29 are disposed at either side of the bucket with a rear wall 30 connecting the respective side wall members 28 and 29. A ledge 31 is disposed about the upper edge of the side wall members and the rear wall members; with a reinforcing bar 32 running around the rear and extending well up from the rear along the side walls and immediately below the ledge 31. Attaching pins 33 and 34 are disposed at the oppositely disposed sides of the bucket to facilitate attachment thereto of the boom. The yoke 24 has spaced side wall members 35 and 36, that are so spaced and shaped, as to engage the oppositely disposed sides of the buckets. The corners of the bucket are rounded, as illustrated at 36A and 37 to facilitate attachment of the boom to the bucket. Receiving notches 38 and 39 are disposed at the outer end of the side members 35 and 36 into which the locking pins 33 and 34 are made to precisely engage when the boom is crowded along either side of the bucket members. When the pins are made to engage within the sockets 38 and 39 the locking latches 40 and 41 are crowded over the notch and pin to thereby maintain the same in precise place and position within the notch. Simultaneously therewith the locking pawl 42 is made to engage the upper side of the rear wall 30 of the bucket. The rear wall 30 of the bucket 43 is made to engage directly upon the knees 44 and 45 of the frame of the boom members, to thereby maintain the bucket rigidly positioned within the boom. The pins 33 and 34 are disposed well to the rear of the center of the bucket, in order that the bucket may be free tilting when raised from the normal supporting surface at which time the locking pawl 42 is disengaged from the bucket. The locking pawl 42 is secured to the lever 45A and the lever 45 is rockably positioned about the journal pin 46 to which the locking latch 40 is secured. The locking pawl 42 being near the center 46 about which the bar rocks is detached from the upper side of the bucket in advance of the release of the locking latch from the pins 38 and 39 so that when the bucket is raised and the locking latch is unlatched the bucket will tilt and its load be dumped automatically therefrom by gravity. The lever 47 disposed adjacent the driver's seat is indirectly secured to the bar 45 by the link 48 to thereby facilitate the manual release and engagement of the bucket with the boom. A foot lever 49 is hingedly disposed about a journal pin 50 and a link 51 connects the foot lever with a bell crank 52 that manipulates a gear shift with the transmission case 14 and when so manipulated, a power shaft 53 is power rotated. A sprocket 54 is mounted upon the shaft and a chain 55 is trained about the sprocket 54 and about the sprocket 56; the sprocket 56 is fixedly positioned upon the shaft 57 and hoisting cables 60 and 61 are trained about the respective hoisting drums so that when the foot lever is manipulated in one direction, the drums are rotated and the cables are wound or released about the drums. The lower end of the cables are secured to brackets 62 and 63 that are secured to the boom frame and when the cable drums are power driven the boom is raised and when released the boom is lowered.

While I have shown the hoist, for the boom, to be made through the use of hoisting drums and cables, I do not wish to be limited in the application of the device to a drum and cable hoist as the hoisting may be made through the use of a piston and piston rod actuated within a cylinder through the use of steam, compressed air, or a noncompressible fluid, as the operating medium. A hydraulic hoist may be found the most satisfactory on the larger machines, or upon machines that are to be subjected to the heaviest forms of work.

Where extremely heavy loads are to be carried within the respective buckets, a counterweight 64 is placed upon the rear of the side frame members. Off-set bands are provided in the side frame members in order to maintain the center of gravity of the operating mechanism as low as possible.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A scraper attachment for traction engines comprising a boom pivoted to the underside of the engine, a yoke secured to the free end of the boom, a receiving notch disposed within each side of the yoke, a locking latch slidably disposed upon each side of the yoke, directly above the notches, a journal pin disposed through the yoke, a link connecting each of the locking latches with said journal pin, a bucket adapted to fit within the yoke, a reinforcing band disposed about the sides and back of the bucket, a pin extending outwardly from each side of the band, said pins adapted to fit within the receiving notches, a plurality of locking pawls adapted to engage with the rear portion of the reinforcing band, and means for actuating the locking latches to thereby remove the bucket from the yoke.

2. Apparatus as in claim 1 where means are associated with the engine for elevating and lowering the boom as desired.

3. Apparatus as in claim 1 wherein the means for actuating the locking latches comprise a lever secured to the journal pin and wherein a manually operable hand lever is connected to the first mentioned lever by a link.

CLARENCE L. CAMP.